May 31, 1966  C. W. VEKOVIUS  3,253,368
SURFACE CONDITIONING GRINDING MACHINE
Filed Oct. 8, 1963  9 Sheets-Sheet 1
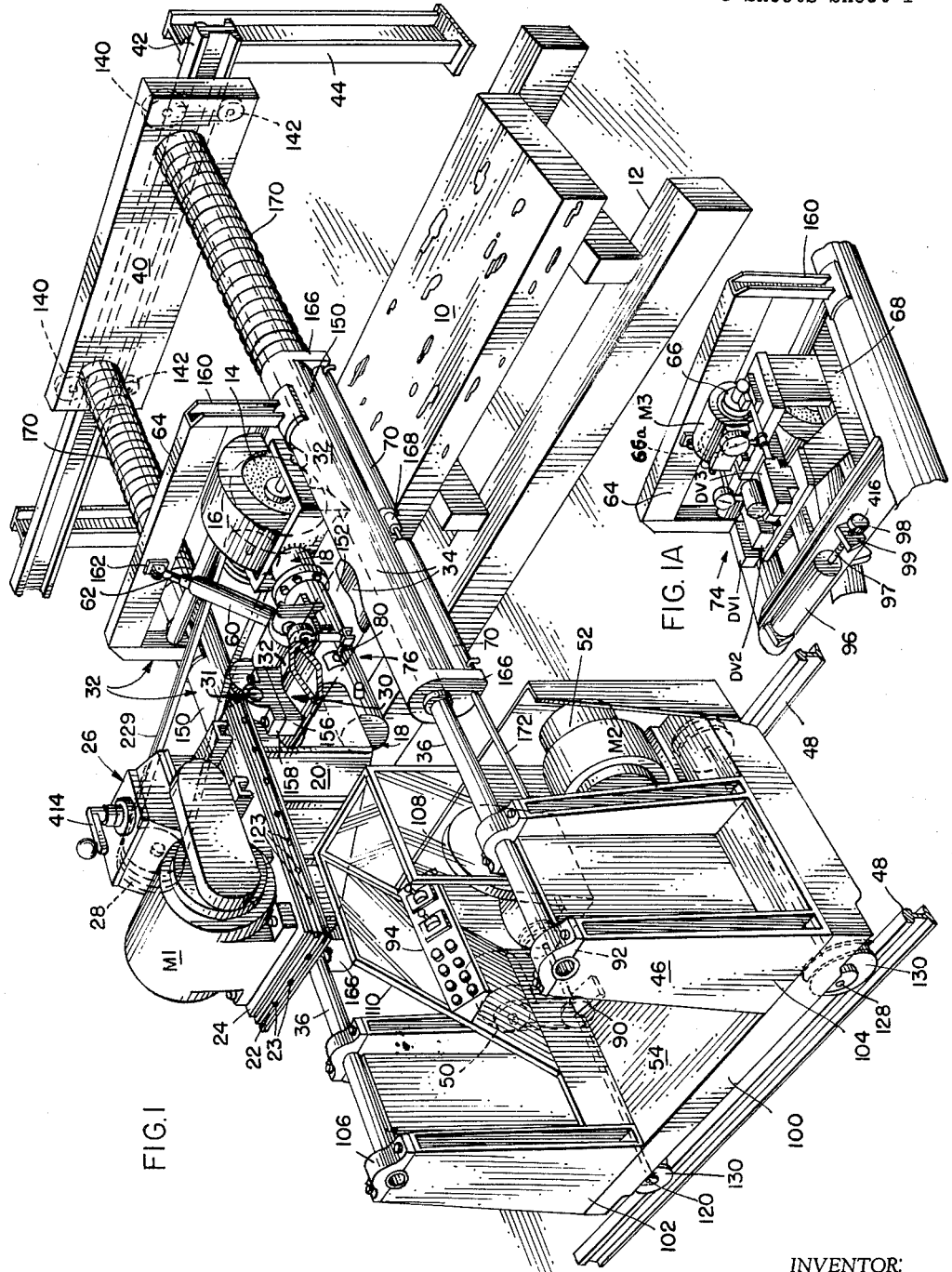
INVENTOR:
CHARLES W. VEKOVIUS
BY 
ATT'Y

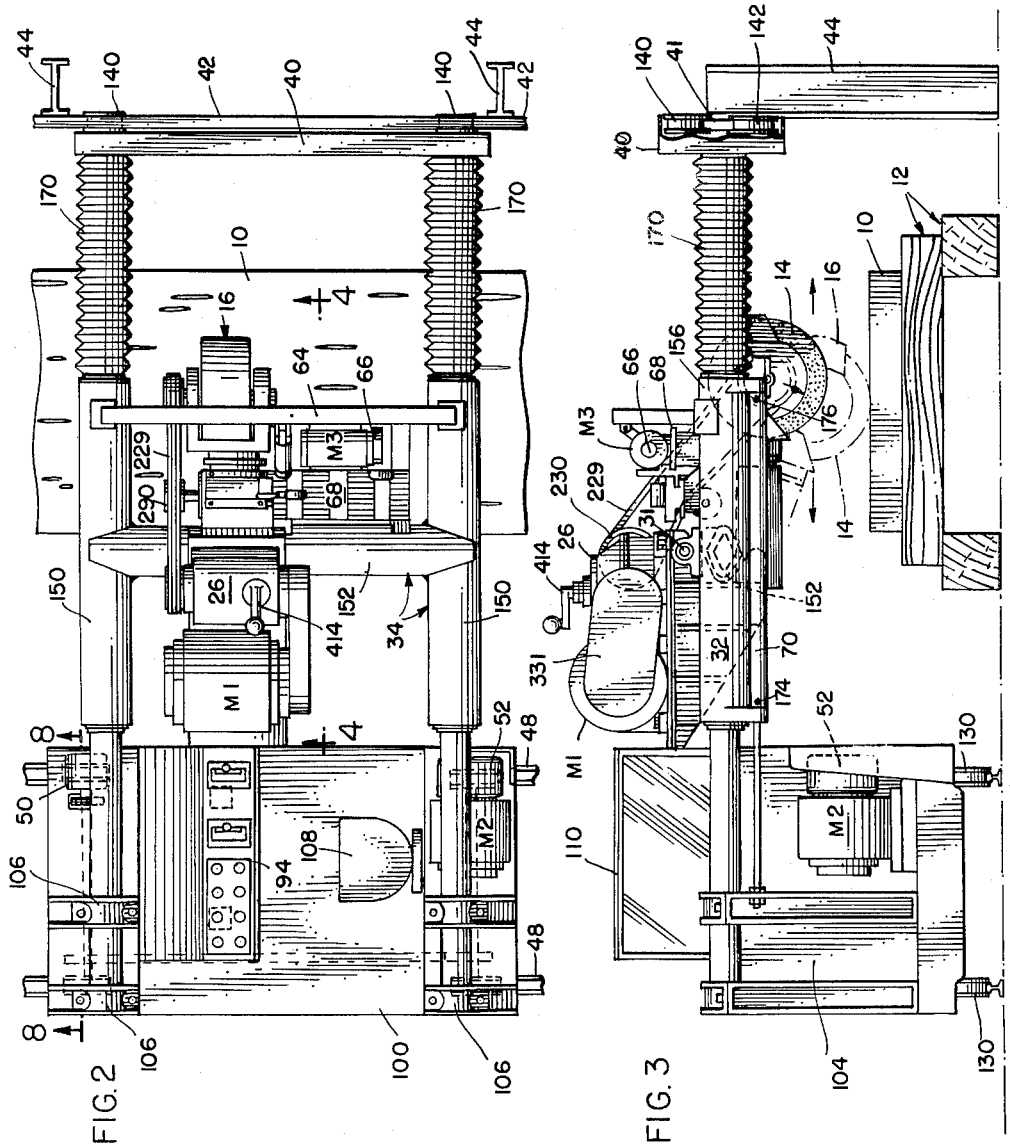

May 31, 1966  C. W. VEKOVIUS  3,253,368
SURFACE CONDITIONING GRINDING MACHINE
Filed Oct. 8, 1963  9 Sheets-Sheet 3

INVENTOR:
CHARLES W. VEKOVIUS
BY
ATT'Y

May 31, 1966  C. W. VEKOVIUS  3,253,368
SURFACE CONDITIONING GRINDING MACHINE
Filed Oct. 8, 1963  9 Sheets-Sheet 4
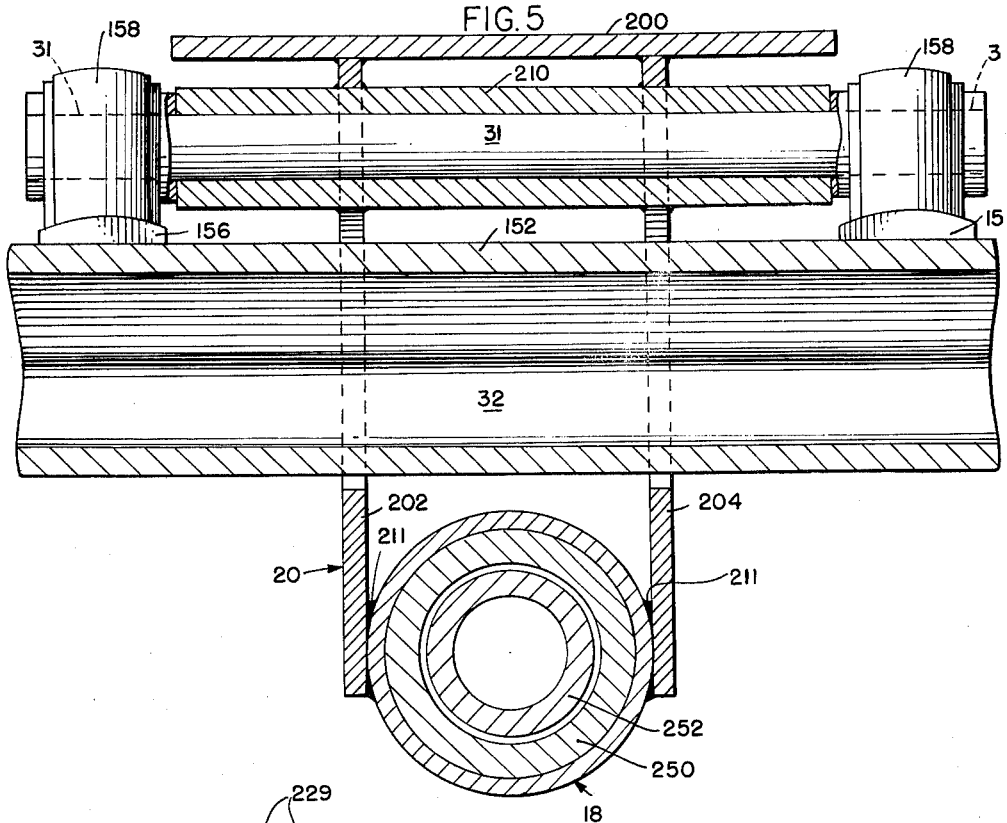
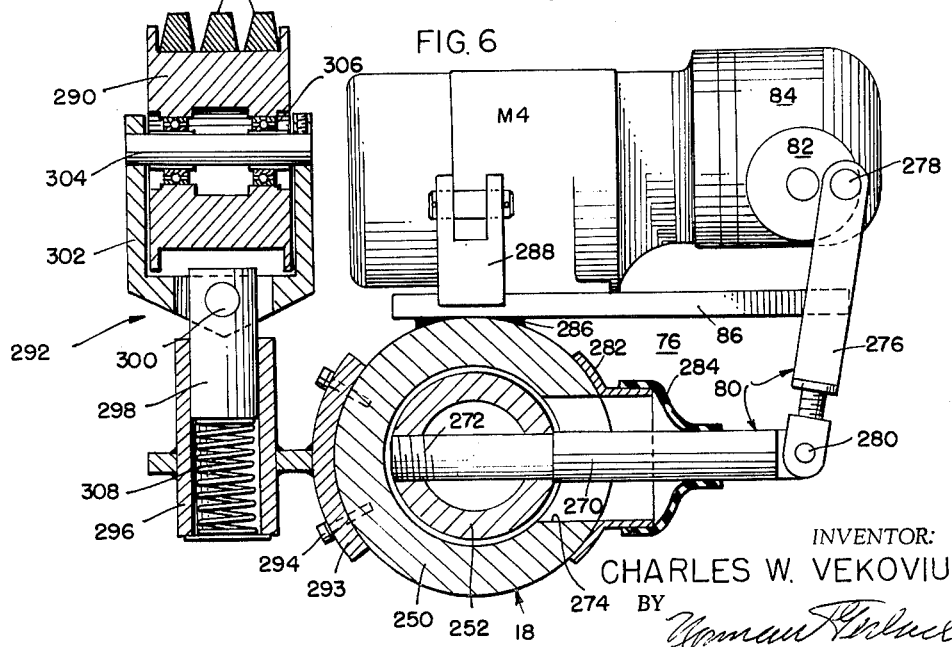
INVENTOR:
CHARLES W. VEKOVIUS
BY
ATT'Y

INVENTOR:
CHARLES W. VEKOVIUS

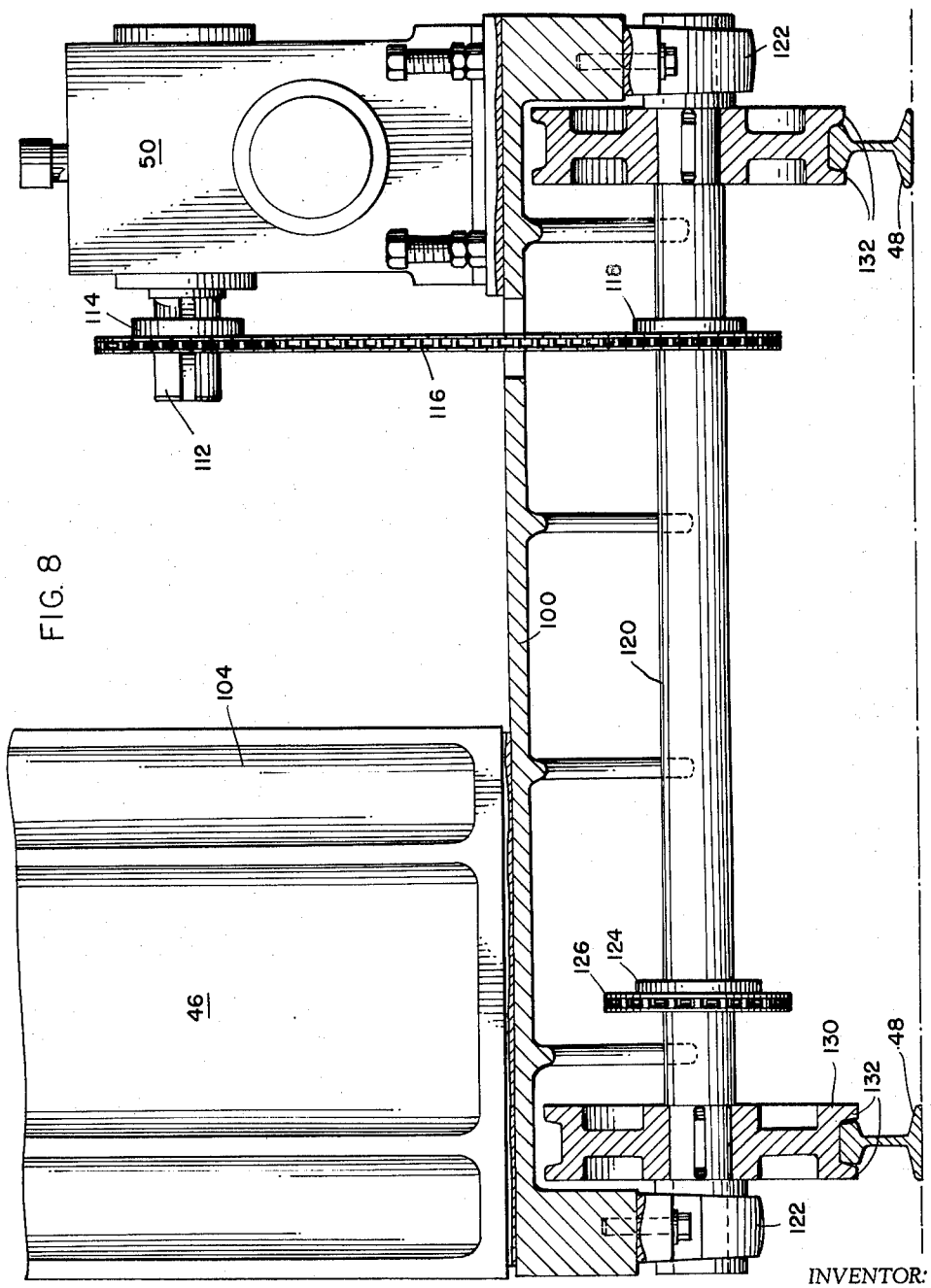

May 31, 1966  C. W. VEKOVIUS  3,253,368
SURFACE CONDITIONING GRINDING MACHINE
Filed Oct. 8, 1963  9 Sheets-Sheet 7
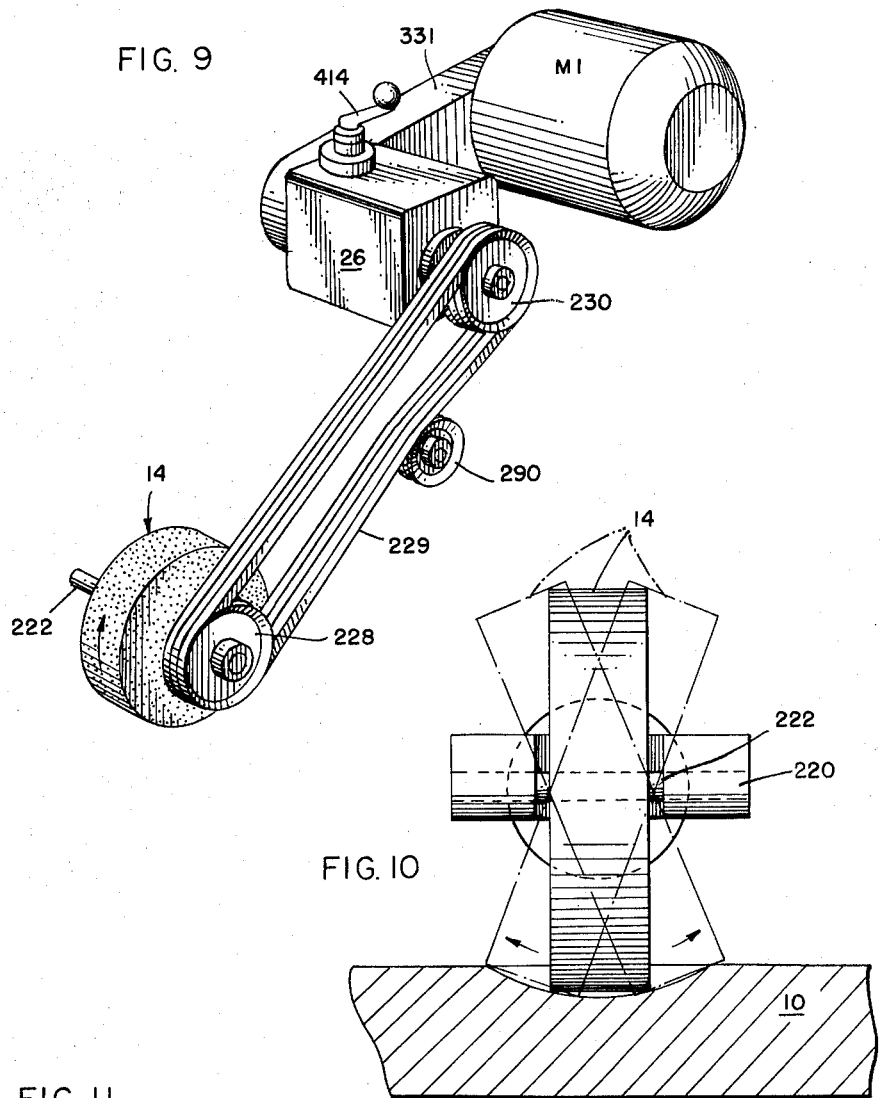
INVENTOR:
CHARLES W. VEKOVIUS
BY
ATT'Y

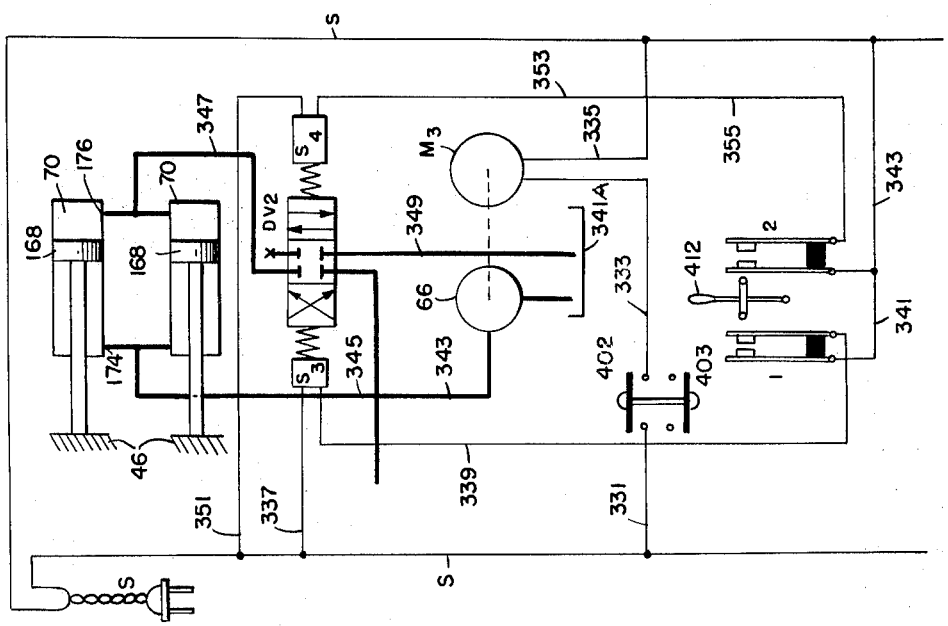

United States Patent Office

3,253,368
SURFACE CONDITIONING GRINDING MACHINE
Charles W. Vekovius, Niles, Ill., assignor to Pettibone
Mulliken Corporation, Chicago, Ill., a corporation of
Delaware
Filed Oct. 8, 1963, Ser. No. 314,706
13 Claims. (Cl. 51—33)

The improved grinding machine comprising the present invention has been designed for use primarily in connection with the conditioning of metal surfaces, for example, the surfaces of a steel billet to remove scale, the usual composite decarburized surface layer, and any cracks or seams which may be hidden by such surface layer, and also to remove such nonmetallic inclusion as may be present at or near the various surfaces of the billet. The invention is, however, capable of other uses and a grinding machine embodying the particular principles of the present invention will be found useful in similarly treating or conditioning ingots, blooms, slabs, consumable electrodes and other articles of work of various shapes and sizes.

In steel manufacture, particularly where stainless alloy steel and carbon steels are concerned, it is necessary to remove the above-noted defects from billets before advancement of the billets to the finishing stages of processing. If such defects are not removed by grinding or otherwise, they take on a predominant aspect in the finished product. While grinding wheel traversing operations across the surface of a billet may remove the scale or decarburized surface layer, such operations seldom will remove all localized defects, such as cracks, seams inclusions and the like and, consequently, after surface conditioning by grinding wheel traverse, it is necessary individually to spot-grind out these localized defects.

Heretofore, billets have been conditioned by means of a class of grinding machines commonly known as swing grinders, such grinders being partially supported by the workmen and partially by overhead cantilever mechanisms. A swing grinding machine of this character is possessed of numerous disadvantages, principal among which are the inordinate strain which is imposed upon the workman operating the machine, and the inability of the machine to maintain uniformity in the quantity of material that is removed from the surfaces of the billets undergoing conditioning. More specifically, the high cantilever support which is offered to the grinding wheel of a swing grinding machine is conducive toward machine framework sagging so that any reaction forces which are imparted to the grinding wheel by the work undergoing conditioning are not resisted by the machine framework and the grinding wheel is consequently subject to bouncing over the particular surface undergoing treatment. Such bouncing effects are frequently enhanced or magnified by structural harmonic vibrations in the machine framework. Additionally, a swing grinding machine must rely, either totally or in part, for grinding wheel pressure against the work upon manually exerted pressure, sometimes coupled with the gravitational force of the grinding wheel head, together with that of the boom which supports the head and any other adjacent machine parts which contribute to the overall weight of the grinding wheel as applied to the work. Since these independentaly movable parts constantly change their positional relationship during grinding wheel manipulation and, since the positional changes frequently involve wide displacement of machine framework mass, shifting of pivot points or axes, wide changes in moments of inertia (occasioned for example by boom-elongation), or fixed counter balancing means to compensate for variable grinding wheel loading, grinding wheel pressure on the work will vary appreciably, even in connection with such modified and improved swing grinders as may utilize hydraulic pressure in an effort to stabilize grinding pressure.

In certain of the more recently designed swing grinders, means is provided for oscillating the rotating grinding wheel about an axis normal to the axis of rotation of the wheel, such means facilitating localized or spot-grinding operations on the billet surface undergoing treatment. Such means, however, invariably has involved oscillation not only of the grinding wheel but also of the grinding wheel supports including, in certain instances, the boom and carriage. This has entailed appreciable framework movement during grinding wheel oscillation so that power losses are involved and, furthermore, grinding wheel manipulation for oscillation purposes is greatly hampered.

Numerous other limitations are attendant upon the construction and use of a conventional grinding machine of the character under consideration, one such limitation being lack of adequate head room.

The present invention is designed to overcome the above-noted limitations which are prevalent in connection with the construction and use of present-day grinding machines and, toward this end, the invention contemplates the provision of an improved grinding machine which provides an extremely low head room and, moreover, affords a low center of gravity and a close grouping of such operating points as are effective, first, to support the grinding wheel when it is not in contact with the work and, second, to afford such necessary reaction force to downward grinding pressure on the grinding wheel that effective wheel stabilization, both during the grinding operation and grinding wheel idling, will at all times be maintained. By reason of these features, high-speed grinding at relatively high pressures with a minimum of vibration or chatter is made possible.

The provision of a grinding machine of the character briefly outlined above being among the principal objects of the invention, it is a further and important object to provide such a machine wherein the rotating grinding wheel is rigidly supported upon a relatively massive carriage, the carriage and grinding wheel supported thereby being approximately balanced so as to possess an appreciable degree of stable equilibrium so that no appreciable gravitational forces are applied to the grinding wheel.

Another object of the invention is to provide a grinding machine in which the down-pressure which is applied to the grinding wheel is in the form of hydraulic pressure which is applied to the wheel through the relatively massive carriage, thus imparting to the grinding wheel not only the stabilizing effect that is offered by a constant maintenance of hydraulic pressure in the hydraulic system, but also offering the additional stabilizing influence that is established by the inertia of the massive carriage. By reason of these stabilizing effects, vibration is reduced to a minimum and the overall noise level of the machine is appreciably less than has heretofore been attained in connection with conventional machines.

A similar and related object of the invention is to provide a grinding machine of the type under consideration and in which the hydraulic pressure which establishes the constant down-pressure on the grinding wheel as outlined above, is maintained solely for this purpose, at least during actual grinding operations, while a separate hydraulic system is maintained for other heavy duty machine movements and operations. Thus, when these latter machine movements and operations are conducted or effected during actual grinding operations as, for example, main machine carriage shifting movements, no drain upon the hydraulic system which supplies the grinding wheel down-pressure will take place and there will be pressure drop in the system to detract from the desired grinding wheel pressure.

The provision of a grinding machine which is relatively simple in its construction and, therefore, considering its size and capacity for work, may be manufactured at a reasonable cost; one which is comprised of a minimum number of parts, particularly moving parts, and, therefore, is unlikely to get out of order; one which is rugged and durable and, therefore, will withstand rough usage; one which is capable of ease of assembly and dismantlement for purposes of inspection, replacement or repair of parts; one which affords to an operator a convenience of operational control hitherto unattainable in connection with conventional grinding machines designed for the same purposes; one which lends itself readily to conventional foundry operations in the manufacture of its component parts; and one which, otherwise, is well adapted to perform the services required of it, are further desirable features which have been borne in mind in the production and development of the present invention.

Numerous other objects and advantages of the invention, not at this time enumerated, will become readily apparent as the nature of the invention is better understood from a consideration of the following detailed description.

In the accompanying nine sheets of drawings forming a part of this specification, one illustrative embodiment of the invention is illustrated.

In these drawings:

FIG. 1 is a front perspective view of a grinding machine embodying the invention and showing the machine in operation upon a steel billet;

FIG. 1A is an enlarged fragmentary perspective view of one of the hydraulic units that form component parts of the improved grinding machine;

FIG. 2 is a top plan view of the machine;

FIG. 3 is a side elevational view of the machine;

FIG. 5 is an enlarged sectional view taken on the line 5—5 of FIG. 4;

FIG. 6 is an enlarged sectional view taken on the line 6—6 of FIG. 4;

FIG. 8 is an enlarged sectional view taken on the line 8—8 of FIG. 2;

FIG. 9 is an enlarged front perspective view, somewhat schematic in its representation, of the variable speed power train which is employed for driving the grinding wheel of the machine, the grinding wheel head, the boom housing and the motor carriage being omitted in the interests of clarity;

FIG. 10 is a front elevational view, schematic in its representation, illustrating the manner in which the grinding wheel carries out spot surfacing operations;

FIG. 11 is a front elevational view of the control panel which is employed in connection with the present grinding machine;

FIG. 12 is a combined electrical and hydraulic circuit diagram of the drive mechanism for the main carriage of the grinding machine;

FIG. 13 is a combined electrical and hydraulic circuit diagram of the drive mechanism for the boom carriage of the machine.

*General description*

Figure 4:
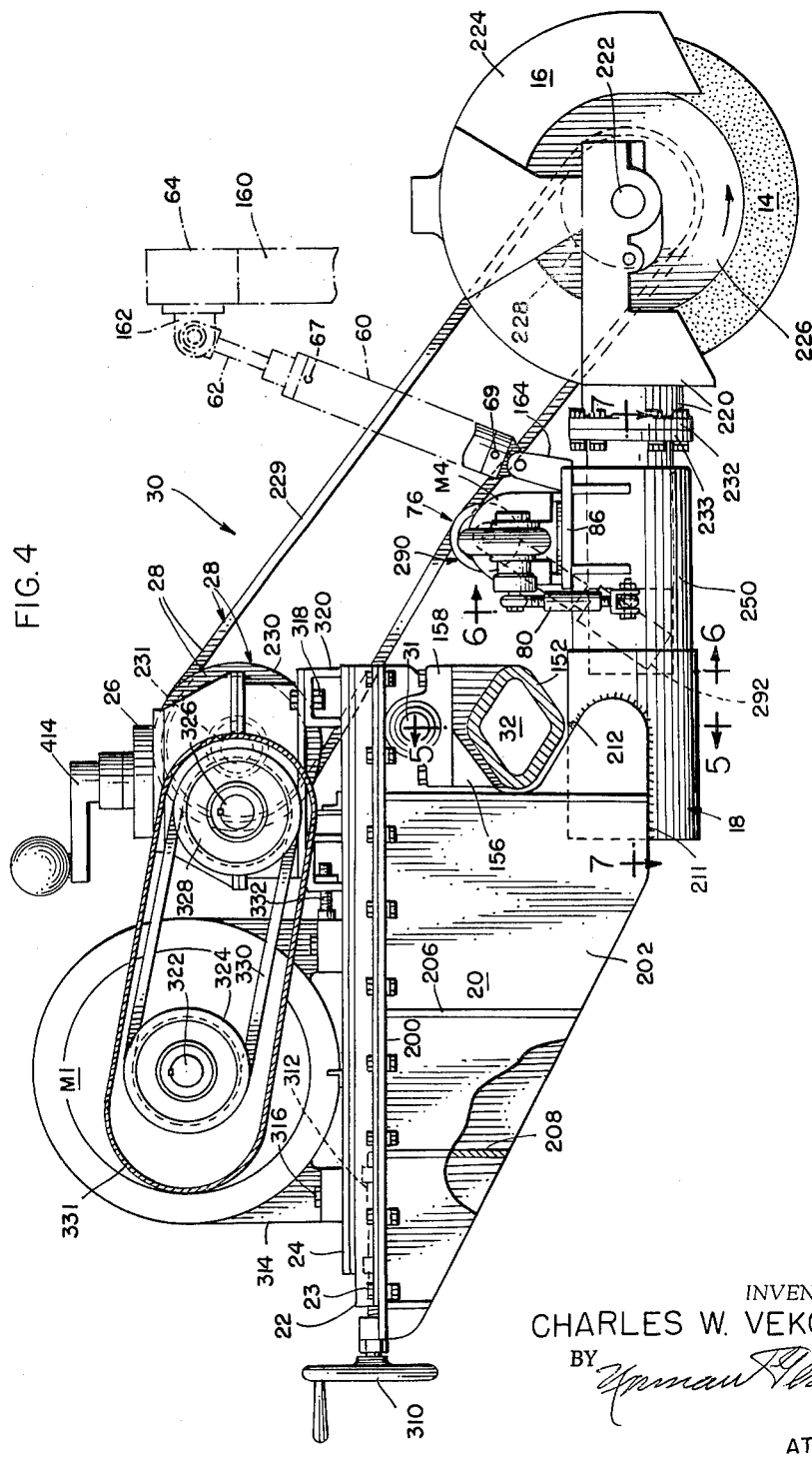
FIG. 4 is an enlarged sectional view taken on the line 4—4 of FIG. 2.
Figure 7:
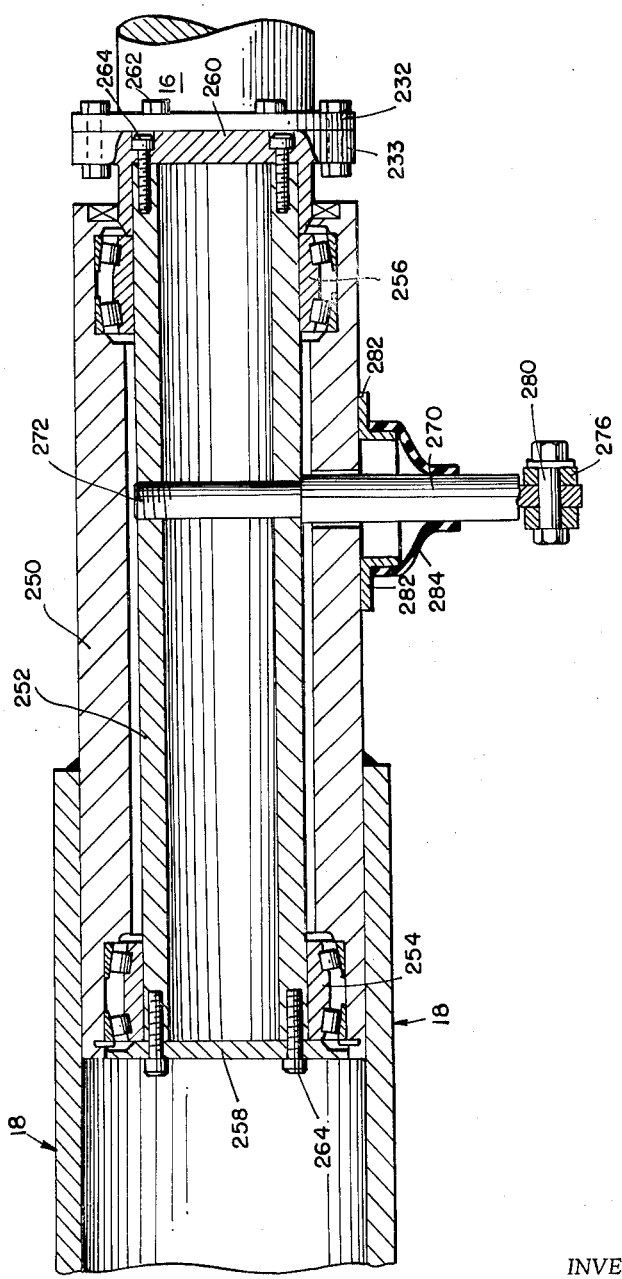
FIG. 7 is an enlarged sectional view taken on the line 7—7 of FIG. 4.

In FIG. 1 an exemplary form of grinding machine for conditioning the surface of a rolled or forged steel billet, slab, or other similar piece of work, is illustrated in its entirety. The illustration is somewhat schematic in its representation inasmuch as certain instrumentalities such, for example, as control cabinets for housing the electrical relays and similar devices, hydraulic piping, electric lead wires, minor manual controls and adjusting mechanism, and other associated parts which bear no direct relation to the present invention, have been omitted in the interests of clarity.

The grinding machine is illustrated on the drawings as being in operation upon the upper surface of a steel billet 10 which is operatively supported upon any suitable supporting structure 12. The latter may be erected in piecemeal fashion on the floor or other supporting surface of the establishment where the machine is used in order to accommodate the desired placement of the billet as to height, longitudinal and transverse span, etc. This supporting structure 12, although it may be erected separately at the grinding region or area of the machine may, for descriptive purposes, be regarded as a functional part of the machine.

The grinding machine employs a single grinding wheel 14 which normally is designed for rotation about a horizontal axis extending parallel to the longitudinal axis or center line of the billet 10 or other work to be operated upon. The grinding wheel constitutes the operative grinding element of a more or less conventional grinding head 16 (see FIG. 4) which is carried at the forward or outer end of a boom 18 (see FIGS. 1, 4 and 6). The boom 18 is carried on a boom housing 20 to which there is bolted as at 23 a motor carriage support 22 (see FIG. 4). Said motor carriage support serves to support a motor carriage 24, the latter being capable of limited forward and rearward shifting movement or adjustment on the motor carriage support 22 for belt-tightening and grinding wheel substitution purposes in a manner that will be made clear presently.

An electric drive motor M1 is mounted on the motor carriage 24 and operates through a four-speed step-up transmission 26 to drive the grinding wheel 14, the transmission 26 being connected to the grinding wheel by a belt and pulley arrangement 28, the nature of which also will be described in detail subsequently.

The machine parts thus far described, i.e., the grinding wheel 14, the boom housing 20, and the motor carriage support 22, together with the motor carriage 24, the motor M1 and the transmission 26, constitute an assembly of parts which hereinafter will be referred to as the boom assembly. This boom assembly has been designated in its entirety by the reference numeral 30 in FIG. 4 and is pivoted at its medial regions for independent tilting or rocking movements bodily as a unit on a horizontal pivot shaft 31 (see also FIG. 5). Said shaft is mounted on and extends transversely of a boom carriage 32, the main framework for which is in the form of an H-shaped casting 34. The boom carriage 32 is slidable in a forward and rearward direction on a pair of horizontally extending guide rails in the form of guide tubes 36 which overlie the billet supporting structure 12 and constitute a supporting bridge structure for the boom carriage 32.

The front ends of the guide tubes 36 are suitably supported on a tail stock carriage 40 which travels endwise and longitudinally on a horizontally extending supporting and guide rail 42, the latter being supported in an elevated horizontal position above the level of the billet 10 on standards 44. The rear ends of the guide tubes 36 are supported in the upper regions of a machine base assembly 46, this base assembly constituting a main machine carriage which travels on rails 48 and is provided with a four-wheel traction power drive under the driving influence of a reversible, combined hydraulic motor and gear reduction device 50 (see FIGS. 1 and 2). Said reversible, combined hydraulic motor and gear reduction device is driven by a pump 52 which in turn is driven or powered by an electric motor M2. The machine base assembly 46 makes provision for an operator's control cab or station 54.

It is to be noted that the two guide tubes 36 provide, in effect, a low level bridge for slidably supporting the boom carriage 32 for movement in a horizontal plane which is displaced only a slight distance above the general plane of operation of the grinding wheel 14 upon the billet 10. Since the two guide tubes 36 and the H-shaped casting 34 are relatively massive structures, the boom assembly 30 as a whole is extremely stable and is not subject to appreciable machine framework deflection. It also is to be noted that the boom housing 20 and the motor carriage support 22 are disposed on one side of the pivotal axis of swinging movement of the boom assembly 30 and the boom 18 and the grinding wheel 14 are disposed on the other side of such axis with the result that the two sets of structures, to a large extent, balance each other and lend a degree of stable equilibrium to the boom assembly 30. Since the boom 18 is relatively short and massive, there is practically no framework deflection between the grinding wheel 14 and the pivotal axis of the boom assembly 30.

Figure 14:
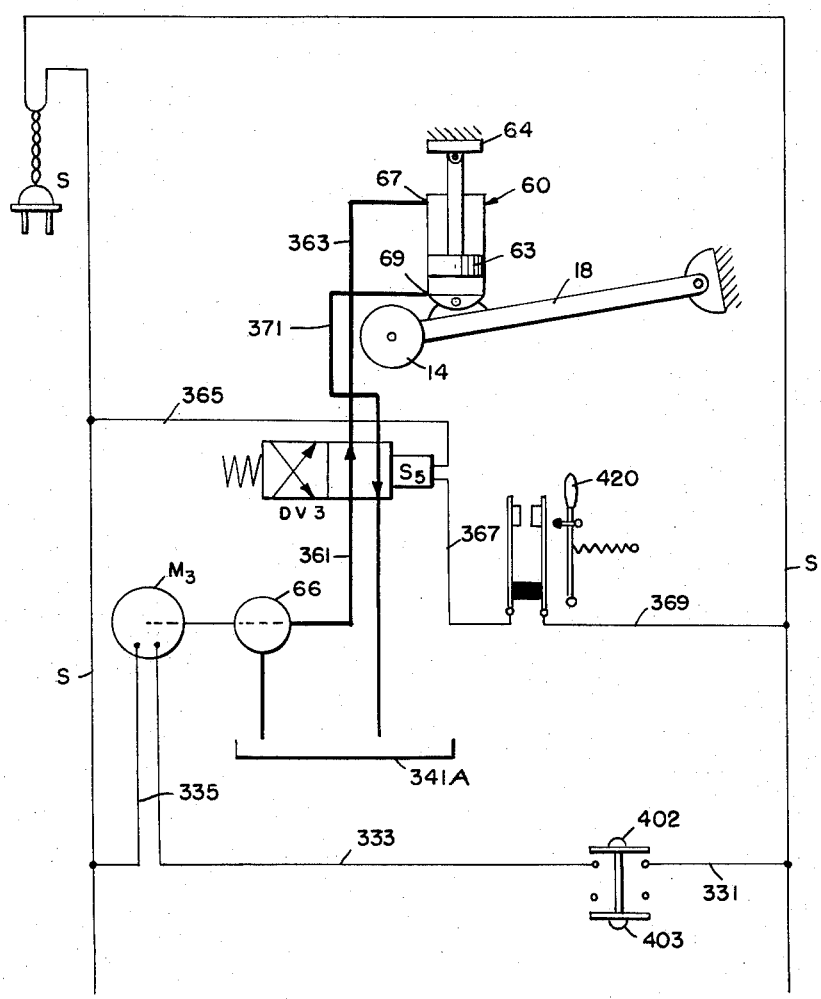
FIG. 14 is a combined electrical and hydraulic circuit diagram of the power mechanism for raising and lowering the grinding wheel.

Means are provided for imparting swinging or tilting movements to the boom assembly 30 as a whole in order to effect raising and lowering movements of the grinding wheel 14 from and to the billet 10 or other workpiece being operated upon, as well as to supply the necessary grinding pressure of the wheel upon the work. As shown in FIG. 4, this means is in the form of an upstanding hydraulic boom cylinder 60 having ports 67 and 69 at its ends. The lower end of the cylinder 60 is pivotally connected to the distal or front end of the boom 18. An upstanding plunger 62, carrying a piston 63 at its lower end (see FIG. 14), projects upwardly from the upper end of the cylinder 60 and is connected at its upper end to a horizontally extending crosshead 64 on the H-shaped casting 34, the point of pivotal connection being directly above the working area of the grinding wheel 14 and in close proximity thereto. As shown in FIG. 14, the cylinder 60 is slidably mounted on the piston 63 at the lower end of the plunger 62. Operating fluid is selectively supplied to the boom cylinder 60 through the ports 67 and 69 from a pump 66 (see FIGS. 1A, 2 and 3) which is driven by an electric motor M3. The pump 66 and the motor M3 are mounted on a shelf-like support 68 which, like the crosshead 64, is carried on the H-shaped casting 34. As shown in FIG. 4, when fluid under pressure is supplied through the port 69 to the cylinder 60 so as to extend or slide the cylinder downwardly, the boom assembly 30 will be swung bodily as a unit in a clockwise direction, as viewed in FIG. 4, to lower the grinding wheel 14. When the fluid under pressure is supplied through the port 67 to the cylinder 60 so as to retract the cylinder upwardly, the boom assembly 30 will swing in the opposite direction and cause the grinding wheel 14 to rise. It should be noted at this time that the point of application of pressure to the boom 18 is in close proximity to the axis of rotation of the grinding wheel and does not shift relatively thereto, and that since the boom assembly 30 is substantially balanced as previously described, the pressure of the grinding wheel upon the surface of the billet 10 or other workpiece is a direct function of the pressure of the fluid in the hydraulic system which includes the cylinder 60, the pump 66 and the motor M3. Thus, except for the relatively small difference in weight which obtains as between a new large diameter wheel 14 and a worn small diameter wheel, the substantially balanced condition of the boom assembly as a whole contributes toward stabilization of grinding pressure at all times.

The forward and rearward movements of the boom carriage 32 are effected under the control of two hydraulic cylinders 70 (see FIGS. 1, 3 and 13). Such cylinders are secured to and move with side members of the H-shaped casting 34. Fluid under pressure for operating the cylinders 70 is supplied by the previously mentioned pump 66 which also supplies fluid under pressure to the cylinder 60 as heretofore described. Hydraulic mechanism 74 which is outlined in phantom in FIG. 1A is provided for the selective admission of fluid under pressure to the cylinder 60 and the cylinders 70 to control the raising and lowering movements and the bodily forward and rearward displacement movements respectively of the grinding wheel 14. This hydraulic mechanism 74 has been shown schematically in FIGS. 13 and 14 and will be described subsequently.

Means in the form of an oscillator assembly 76 (see FIGS. 1 and 6) is provided for effecting oscillation of the grinding head 16 about the longitudinal axis of the boom 18. Accordingly and as will be set forth more fully presently, the grinding head 16 is mounted for limited oscillating movement on the distal or front end of the boom 18. As best shown in FIG. 6, the grinding wheel 16 is connected through a crank arm and coupling assembly 80 to a rotary eccentric wheel 82 on the output shaft of a gear reduction device 84. The latter is driven by an electric motor M4 which is mounted on a platform or motor mount 86 that is supported adjacent to the front end of the boom 18. Oscillation of the grinding head may be resorted to either for wheel dressing or spot grinding purposes as will be set forth in detail presently in connection with FIG. 10.

Referring again to FIG. 1, the operator's cab 54 is provided with pedal controls 90 and 92 for effecting reversal of the hydraulic motor 50, and also with manual controls which are mounted on a panel 94 (see FIG. 11) within the cab. These controls, in addition to providing for individual operation of the various reversing and other valves in associated relation with the hydraulic circuitry for the machine also include an automatic control whereby the forward and rearward movements of the boom carriage 32 may be indexed in small increments which may be varied from one-eighth of an inch to three inches, for example, to the end that the grinding wheel 14 may be caused to traverse the longitudinal span of the billet 10 in serpentine fashion, the grinding wheel 14 advancing progressively a predetermined small distance at the end of each longitudinal traverse alternately at opposite ends of the billet. The automatic control just referred to sets into operation a metering cylinder 96 which is mounted on the boom carriage 32 (see FIG. 1A) and controls the amount or volume of fluid under pressure that is admitted to the cylinders 70 so that upon each actuation of these latter cylinders their displacements will be a function of the small quantity of fluid that is admitted or delivered thereto by the metering cylinder 96. This metering cylinder 96 is provided with a plunger 97 the stroke of which is regulated by a stop screw 98. The latter is threadedly received through a bracket 99 which is fixedly mounted on the boom carriage 32.

The overall or general hydraulic circuitry, and the electrical control means therefor by means of which the various operative machine instrumentalities, such as the pumps, hydraulic cylinders and electric motors, are actuated or energized, have been illustrated herein in simplified form. They have been variously disclosed in copending United States patent application Serial No. 372,032, filed on June 2, 1964, by Vincent Janis, Jr., and Gul P. Bhatia, and entitled "Grinding Machine Control System," and in copending United States patent application Serial No. 372,033, filed on June 2, 1964, by said Vincent Janis, Jr., and Gul P. Bhatia, and entitled "Grinding Machine with Automatic Safety Drop-Off Control Circuit Therefor." Reference may be had to these two applications for a full understanding of the various control means whereby the present grinding machine may, if desired, be operated, either in a semi-automatic or in a fully automatic manner.

*The machine base assembly*

The machine base assembly 46 is in the form of a wheeled vehicle and, as previously pointed out, constitutes a main carriage for all of the operative machine instrumentalities. This base assembly involves in its general organization a horizontal base platform 100 (see FIGS. 1, 2, 3 and 8) from which there project upwardly two standards 102 and 104. These standards serve to support the rear end regions of the two horizontal guide tubes 36, the tubes being secured to the upper ends of the standards by means of bolted-in-place clamping caps 106. The space between the two standards 102 and 104 constitutes the previously mentioned operator's cab 54. The latter is equipped with an operator's seat 108 which is so positioned that it is convenient to the pedals 90 and 92 and to the control panel 94. The cab 54 is also equipped with a transparent shield assembly 110. The electric motor M2 and the pump 52 constitute a unitary assembly which is disposed at one corner of the platform 100 and alongside of the standard 104. The combined hydraulic motor and gear reduction device 50 is similarly disposed alongside of the standard 102. As best shown in FIG. 8, the combined hydraulic motor and gear reduction device 50 is provided with an output shaft 112. The latter has fixedly mounted thereon a sprocket 114 which is operatively connected by an endless chain 116 to a driven sprocket 118. Said driven sprocket is fixedly mounted on a driving axle 120 which is supported beneath the platform 100 in bearings 122. The driving axle 120 carries a fixedly mounted sprocket 124 which is connected by an endless chain 126 to a second driving axle 128 (see FIG. 1), such second driving axle being similarly supported beneath the platform 100. The two axles 120 and 128 fixedly carry respective pairs of traction wheels 130 which are dual flanged as shown at 132 in FIG. 8 and travel on horizontal, spaced apart rails 48 on the floor of the establishment where the grinding machine is utilized. In this manner, a reversible four-wheel drive is established for travel of the machine base assembly 46 longitudinally along the rails 48, such movement being required for longitudinal traverse movements of the grinding wheel 14.

The guide tubes 36 and the tail stock carriage 40 may be regarded as a portion of the machine base assembly 46 inasmuch as these members or parts are fixedly secured to and move bodily with the assembly. The tail stock carriage 40 is in the form of a rectangular horizontally extending plate (FIGS. 1, 2 and 3) which carries at its ends a pair of upper dual-flanged wheels 140. The latter overlie and travel on the horizontal rail 42 and prevent downward tilting of the machine as a whole. Two cooperating lower take-up or follower wheels 142 are mounted on the ends of the plate directly under the upper wheels 140. They underlie the rail 42. By reason of the fact that the wheels 140 and 142 are disposed at the ends of the tail stock carriage 40 and the further fact that there is a wide horizontal spread presented by these wheels, free movement of the tail stock carriage 40 in following the movements of the machine base assembly 46 on the rails 48 without carriage binding is attained with no appreciable angular displacement of the guide tubes 36 from their forward and rearword direction of extent.

The boom carriage

The details of the boom carriage 32 are best illustrated in FIGS. 1, 2 and 3. As previously stated, the framework of this boom carriage, in the main, consists of the H-shaped casting 34. This casting is relatively massive and it includes two side members in the form of tubular members or sleeves 150 and an intermediate cross member 152 between the two sleeves (see also FIG. 4). The cross member 152 is generally of rectangular tubular construction as shown in FIG. 4 and, on the remote side of the machine as viewed in FIG. 1, the adjacent end region of the cross member 152 is formed with a pair of upstanding spaced apart bearing supports 156 to which there are suitably secured respective pillow supports 158, the two pillow supports receiving therein the previously mentioned supporting shaft 31 on which the boom assembly 30 is pivoted for forward and rearward rocking movements.

The shelf-like support 68 which supports the pump 66 and the motor M3 is also supported from the cross member 154 of the H-shaped casting 34 as shown in FIG. 1A, while the metering cylinder 96 is supported directly on this cross member.

The crosshead 64 is mounted in an elevated position by way of a pair of standards 160 (see FIG. 1). The latter are connected to, and extend upwards from, the front ends of the sleeves 150. The hydraulic cylinder 60 which controls the raising and lowering movements of the grinding wheel 14 extends between a point on the central region of the crosshead 64 and a point adjacent to the free end of the boom 18. Accordingly, the upper end of the plunger 62 is pivotally attached to a bracket 162 (see FIG. 4) on the crosshead 64, while the lower end of the cylinder 60 is pivotally connected to a similar bracket 164 on the outer extremity of the boom 18.

The hydraulic cylinders 70 from which the boom carriage 32 derives its forward and rearward motion constitute a part of the boom carriage, and they are coextensive with and underlie the two sleeves 150 respectively. The ends of the cylinders 70 are supported in sockets in downwardly extending integral extensions 166 at the ends of the sleeves 150. A fixed reaction piston 168 is disposed within each cylinder 70 and is mounted on the front end of a horizontal reaction rod 172, the other or rear end of the rod being secured to one of the standards 102 or 104, as the case may be. The rods 172 enter the rear ends of the cylinders 70 through the two rear extensions 166. Each cylinder 70 is provided on opposite sides of its piston 168 with a pair of fluid ports 174 and 176 (see FIGS. 3 and 13), these ports being operatively connected to the pump 66 by means of the hydraulic mechanism 74 on the shelf-like support 68. Flexible accordion boots 170 extend between the front ends of the sleeves 150 and the ends of the tail stock carriage 40 and surround the guide tubes 36 in protective relationship.

The boom assembly

The boom assembly 30 comprises three principal parts, namely, the boom 18, the boom housing 20, and the motor carriage support 22. It also comprises the associated instrumentalities of such parts.

*The boom housing.*—The boom housing 20 provides a proximate support for the boom 18 and, as best shown in FIGS. 1, 4 and 5, is in the form of a casting which is generally of inverted U-shape in transverse cross section and comprises a platform-like top wall 200 and depending vertical side walls 202 and 204 at the side portions of the top wall. The boom housing also comprises outside transversely extending gusset plates 206 for reinforcing purposes, and also inside transverse webs 208 which extend between the side walls 202 and 204. A horizontally extending, relatively massive bearing sleeve 210 (see FIG. 5) is supported from the boom housing side walls 202 and 204 a slight distance below the top wall 200 and at the forward end of the boom housing and surrounds the supporting shaft 31, thus effectively pivoting the boom housing as a whole for rocking movements about the axis of said shaft 31 as previously described.

The boom 18 has its proximate or rear end region welded as at 211 between the front lower corner regions of the two side walls 202 and 204 of the boom housing 20, the longitudinal axis of the boom extending parallel to the plane of the top wall 200 and the region of weld being disposed substantially directly beneath the supporting shaft 31. The central portions of the front margins of the side walls 202 and 204 are provided with cutouts 212 in order to accommodate the cross member 152 of the H-shaped casting 34 during swinging movements of the boom assembly 30 bodily about the axis of the supporting shaft 31. In the extreme elevated position of the grinding wheel 14, the parts assume the positions in which they are shown in FIG. 4 with the boom 18 extending substantially horizontally and with the cross member 152 being nested within the aforementioned cut-outs 212. With the boom 18 in this position, the condition of the hydraulic cylinder 60 is such that the cylinder is in its retracted position with the piston 63 being disposed in the lower end regions of the cylinder 60. Upon admission of fluid under pressure through the port 69 into the lower end regions of the cylinder 60, the cylinder 60 will move downwardly with the piston 63 functioning as a reaction member, thus swinging the entire boom assembly 30 in a clockwise direction as viewed in FIG. 4, with resultant lowering of the grinding wheel 14. As will be described in greater detail presently, during normal grinding operations fluid under pressure is maintained in the lower end regions of the cylinder 60 and the grinding pressure which is maintained by the grinding wheel 14 upon the billet 10 or other work is almost entirely a function of this fluid pressure.

*The grinding head and boom.*—The grinding head 16 per se is of conventional design and no claim is made herein to any novelty associated with the same. The head is of the high-speed type and includes a spindle holder 220 (see FIG. 4). The latter carries a spindle 222 on which the grinding wheel 14 is mounted; and it also carries an arcuate wheel guard 224. The grinding wheel 14 has a hub 226 which is provided at one end thereof with a fixed driven pulley 228. The latter constitutes an element of the previously mentioned belt and pulley arrangement 28 and is designed for reception thereover of a multiple V-belt 229 which also passes over a pulley 230 on one end of the output shaft 231 of the transmission 26, the belt 229 and pulley 230 also constituting a part of the previously mentioned belt and pulley arrangement 28. The spindle holder 220 is provided at its rear portion with an annular attachment flange 232 which abuts against a similar annular flange 233 at the front end of the boom 18.

As best shown in FIGS. 4 to 7, the boom 18 includes at its front end an outer boom shaft 250 and an inner tubular boom shaft 252, the latter being rotatably supported within the former by means of anti-friction bearings 254 and 256 in the end portions of the outer boom shaft 250. The bearing 254 is located at the rear of the outer boom shaft 250 and is held in place by way of a combined retainer and adapter plate 258. The bearing 256 is located at the front end of the outer boom shaft 250 and is held in position by a combined retainer and adapter plate 260, this latter plate embodying the previously mentioned annular flange 233 which is secured to the flange 232 on the spindle holder 220 of the grinding head 16 by way of an annular series of bolts 262. The two plates 258 and 260 are secured to their respective ends of the inner tubular boom shaft 252 by screws 264.

*The oscillator assembly.*—The details of the oscillator assembly 76 are illustrated in FIG. 6. This assembly includes the previously mentioned electric motor M4, the gear reduction device 84, the eccentric wheel 82, and the crank arm and coupling assembly 80. The crank arm and coupling assembly includes a crank arm proper 270 which has one end thereof threadedly received as at 272 in a diametric socket in the inner tubular boom shaft 252. The crank arm proper 270 projects radially outwardly from the inner tubular boom shaft and extends through a circumferential slot 274 in the wall of the outer tubular boom shaft 250. The crank arm and coupling assembly 80 further includes an adjustable length coupling rod 276, one end of which is connected to an eccentric crank pin 278 on the eccentric wheel 82. The other end of the coupling rod 276 is connected by a pivot pin 280 to the outer or distal end of the crank arm proper 270. A boot housing 282 on the outer tubular boom shaft 250 and a flexible boot 284 between the boot housing and the central portion of the crank arm proper 270 serve to seal the slot 274 against the entrance of dirt or other foreign matter into the interior of the outer tubular boom shaft 250.

The motor platform or mount 86 is supported directly on the upper front portion of the outer tubular boom shaft 250 of the boom 18 and is welded in position as at 286 (see FIG. 6) so that it assumes a tangential relationship with respect to the boom and is disposed in a substantially horizontal plane when the boom is in its raised position. Removable bracket means 288 are provided for releasably maintaining the electric motor M4 in position on the platform 86.

From the above description, it will be seen that, upon energization of the electric motor M4 and consequent rotation of the eccentric wheel 82 of the gear reduction device 84, the crank arm and coupling assembly 80 will be set into operation, thus initiating an oscillating or rocking movement of the crank arm 270 so that the inner tubular boom shaft 252 is caused to oscillate in the bearings 254 and 256 within the outer boom shaft 250. Such oscillation of the inner tubular boom shaft 252 will effect oscillation of the grinding head 16 for spot-grinding purposes as will be described in detail when the operation of the grinding machine is set forth.

Referring now to FIGS. 1, 4 and 6, the tension of the multiple V-belt 229 is controlled by an idler wheel 290 which constitutes an element or part of an idler arm assembly 292, the details of which are best illustrated in FIG. 6. This idler arm assembly 292 further includes an arcuate saddle bracket 293 which is secured by screws 294 to the outer tubular boom shaft 250 and carries a spring retainer in the form of a vertical sleeve 296. Within this sleeve is telescopically slidable a supporting shank 298 to which there is pivoted as at 300 a yoke 302. The latter carries an idler shaft 304 on which the idler wheel 290 is rotatably mounted by means of ball or other anti-friction bearings 306. A spiral compression spring 308 within the sleeve 296 serves yieldingly to urge the shank 298 and, consequently, the idler yoke 302 and the idler wheel 290 upwardly and into contact with the multiple V-belt 229.

*The motor carriage.*—Referring now to FIG. 4, the carriage 24 for the motor M1 is slidable on the motor carriage support 22 in a forward and rearward direction throughout a limited range of movement and it is thus movable under the control of a hand wheel 310 which turns a worm 312 in opposite directions for carriage-shifting purposes. The housing 314 of the motor M1 is adjustably clamped to the carriage 24 by means of clamping screws 316 while the transmission 26 is bolted as at 318 to a platform 320 which is fixedly mounted on the motor carriage 24. The output shaft 322 of the motor M1 carries a pulley 324 while the input shaft 326 of the transmission 26 carries a similar pulley 328. An endless belt 330 passes around both of the pulleys 324 and 328 in driving relationship. A guard or shield 331 encloses both pulleys and the belt for protection purposes. Adjusting screws 332 having threaded engagement with the platform 320 bear against the motor housing 314 and lock the motor M1 in its various adjusted positions. The adjusting screws 332 are provided in order to effect adjustment of the tension of the belt 330. The hand wheel 310 is provided for the purpose of sliding the carriage 24 forwardly to relieve the tension of the belt 229 for belt-changing purposes, as well as for grinding wheel substitution.

*Electric and hydraulic control mechanism*

The main hydraulic circuitry and the control means therefor whereby the electric motor M2 and the pump 52 are actuated in order to shift the machine base assembly 46 in opposite directions along the rails 48 and thus effect traversing of the billet 10 by the grinding wheel 14; whereby the electric motor M3 and the pump 66 are actuated to control the operation of the hydraulic boom cylinder 60 to tilt the boom assembly 30 bodily as a whole about the axis of the shaft 31 and effect raising and lowering of the grinding wheel 14; whereby motive fluid under pressure is supplied from the pump 66 to the hydraulic cylinders 70, either under manual or automatic control operations, in order to feed the boom carriage 32 in a forward and rearward direction to effect transverse grinding wheel placement on the billet 10; whereby change-over from manual to automatic operation and vice versa are accomplished; and whereby the oscillator assembly 76 is set into, and maintained in, operation for spot-grinding purposes, have not been illustrated in detail herein, the representation at various places throughout the drawings being purely schematic. It is pointed out, however, that all control functions are effected by the operator from the control cab 54 on the machine base assembly 46 of the machine and are accommodated by the provision of the two foot pedals 90 and 92, and the control panel 94 which has been shown in detail in FIG. 11. These cab controls are merely exemplary of a convenient control system which has proven effective in actual practice and, obviously, other controls, whether pedal or manually operated, are contemplated.

In FIG. 11, eight control buttons 400, 401, 402, 403, 404, 405, 406 and 407 are illustrated as being mounted in a panel insert 410.

The button 400 may be employed either directly or through appropriate relay mechanism to energize the electric motor M2 and thus set the hydraulic pump 52 into operation so as to supply motive fluid under pressure to the combined motor and gear reduction device 50. With the motor and gear reduction device 50 in operation, the foot pedal 90 may be employed in connection with suitable valve mechanism (not shown) to direct fluid under pressure to the combined pump and gear reduction device 52 for operating the same in one direction, while the pedal 92 may be employed for directing fluid under pressure to the combined motor and gear reduction device 50 to drive the same in the opposite direction, thus giving the operator control over the travel of the machine base assembly 46 on the rails 48.

The button 401 may similarly be employed to open the electric circuit for the motor M2. A simplified electrically controlled hydraulic circuit for effecting movement of the main base assembly 46 and utilizing the control buttons 400 and 401 has been shown in FIG. 12 and will be described presently.

The button 402 may be employed in a similar manner to energize the motor M3 which drives the pump 66 (see FIG. 1A) so that motive fluid under pressure may be supplied to the two hydraulic cylinders 70 to effect forward and rearward movements of the boom carriage 32, and also may be supplied to the hydraulic cylinder 60 so that tilting or rocking movements of the boom assembly 30 as a whole may be effected. With the motor M3 and the pump 66 in operation, a control lever or stick 412 on the control panel 94 may be employed to effect selective control of the forward and rearward movements of the boom carriage 32 as indicated by the labeling in FIG. 11. Similarly, a control lever or stick 413 may be employed to effect selective control of the raising and lowering movements of the grinding wheel 14. The button 403 may be employed to open the electric circuit for the motor M3. A simplified hydraulic circuit utilizing the control buttons 402 and 403 for effecting these functions has been shown in FIGS. 13 and 14, the circuit of FIG. 13 relating to boom carriage movements and the circuit of FIG. 14 relating to grinding wheel elevational movements.

The button 404 may be employed to energize the motor M1 and thus drive the grinding wheel 14 through the medium of the four-way step-up transmission 26, a suitable gear shift lever 414 being provided on the transmission to effect the desired gear ratio changes. The button 405 may be employed to open the electric circuit for the motor M1 and thus stop drive of the motor.

The button 406 may be employed to initiate automatic operation of the machine whereby the metering cylinder 96 is caused periodically at the end of each traverse operation on the billet 10 to feed measured quantities of fluid under pressure to the cylinders 70. A manually operable adjusting wheel 416 (see FIG. 1A) is provided on the stop screw 98 to facilitate setting of the latter for different displacements by the cylinder 96. The manner in which the button 406 initiates automatic machine functions may vary widely but it is contemplated that suitable solenoid-actuated valve mechanism will be employed and embodied in the mechanism 74 of FIG. 1A in order to relate the hydraulic cylinder 96 to the two cylinders 70. No claim is made herein to any novelty in the use of the metering cylinder 96 inasmuch as the use of such a metering device has been set forth and claimed in aforementioned copending patent application Serial No. 372,032.

The button 407 may be employed to initiate operation of the oscillator assembly 76, this button serving either directly or through suitable relay mechanism to energize the electric motor M4.

*Main machine carriage drive.*—Referring now to FIG. 12 wherein the electrically controlled hydraulic circuitry for the pump 52 on the main machine base assembly 46 is schematically illustrated, the heavy lines represent hydraulic fluid lines or piping while the light lines represent circuit lead lines or wires. The electric circuit for energizing the motor M2 for driving the pump 52 which, in turn, supplies fluid under pressure to the reversible, combined hydraulic motor and gear reduction device 50 extends from the current source S through a lead 301, the contacts of the control button 404, a lead 302, the motor M2 and a lead 303 back to the source S. Energization of the motor M2 serves to drive the pump 52 and establish a normal idling circuit extending from a sump 304, through a line 305, the pump 52, a line 307, a directional valve DV and a line 308 back to the sump. A pressure relief or bleed valve PRV is disposed in the line 305 and serves a purpose that will be made clear subsequently.

Directional control of the hydraulic motor and gear reduction device 50 is effected by means of the previously mentioned solenoid-actuated directional valve DV, the solenoid of which is of the dual-acting type and has dual windings S1 and S2. Under normal or idling conditions when the machine base assembly 46 is motionless on the rails 48, both windings S1, S2 of the solenoid remain deenergized and the previously described hydraulic circuit through the pump 52 obtains. However, if either solenoid winding is energized, to the exclusion of the other, the valve DV will direct a flow of fluid under the combined motor and gear reduction device 50 to set the same into operation and drive the traction wheels 130 in one direction or the other, depending upon which solenoid winding is energized. If, for example, it is desired to drive the machine base assembly 46 to the left as viewed in FIG. 1, the solenoid winding S1 is energized, thus establishing an hydraulic circuit extending from the sump 304 through line 305, valve PRV, pump 52, line 307, directional valve DV, line 309, combined motor and gear reduction device 50, line 311, valve DV and line 308 to the sump, thus driving the motor 50 in the proper direction for such assembly movement. If it is desired to drive the machine base assembly 46 to the right as viewed in FIG. 1, the solenoid winding S2 is energized to the exclusion of the winding S1 and a reversal of fluid under pressure in the circuit just described will result.

Selective energization of the two solenoid windings S1 and S2 is effected by the operator in the control cab 54, utilizing the pedals 90 and 92. Depression of the pedal 90 will establish an electric circuit extending from the source S, through a lead 315, the solenoid S1, a lead 317, normally open #1 contacts of the pedal 90 (now closed), normally closed #1 contacts of the pedal 92, and a lead 319 back to the source. Such depression of the pedal 90 serves to open the normally closed #2 contacts thereof so that the circuit for the solenoid winding S2 remains open. Depression of the pedal 92 will establish an electric circuit extending from the source S, through a lead 321, the winding S2, a lead 323, normally closed #2 contacts of the pedal 90, normally open #2 contacts of the pedal 92 (now closed) and a lead 325 to the source S. Opening of the normally closed #1 contacts of the pedal 92 prevents the circuit for the solenoid winding S1 from becoming energized.

The pressure relief valve PRV is provided for regulating the speed of the reversible, combined motor and gear reduction device 50 and, consequently, the speed of travel of the machine base assembly 46 on the rails 48.

*The boom carriage drive.*—Referring now to FIG. 13 wherein the electrically controlled hydraulic circuitry for effecting operation of the pump 66 on the shelf-like support 68 on the boom carriage 32 and for directing fluid under pressure from this pump to the two cylinders 70 (see FIG. 1) in order to shift the boom carriage 32 in opposite directions, is shown, the electric circuit for the motor M3 which drives the pump 66 extends from the source S, through a lead 331, the contacts of the control button 402, a lead 333, the motor M3, and a lead 335 back to the source S. Energization of the motor M3 serves to drive the pump 66. This pump 66 supplies motive fluid under pressure to the two cylinders 70 as previously described in order to effect boom carriage shifting movements in opposite directions under the control of a solenoid-actuated directional valve DV2 which is similar to the valve DV1 and has the solenoid component thereof provided with dual windings S3 and S4. The solenoid windings S3 and S4 are adapted to be selectively energized under the manual control of the operator in the control cab 54 upon manipulation of the lever 412. When the operator moves the lever 412 in a counterclockwise direction as viewed in FIG. 13, the normally open #1 contacts of the lever become closed to establish an electric circuit through the winding S3. This circuit extends from the source S, through a lead 337, the winding S3, a lead 339, the #1 contacts of the lever 412, and two leads 341, 343 back to the source S. Energization of the winding S3 establishes an hydraulic circuit extending from a sump 341A, through the pump 66, two lines 343, 345, and ports 174 of the cylinders 70, thus retracting the cylinders toward the main machine base 46 (see also FIG. 1) and shifting the boom carriage 32, together with the entire boom assembly 30 rearwardly on the guide tubes 36.

Forward movement of the boom carriage 32 on the guide tubes 36 is effected under the control of a similar electric circuit for the solenoid winding S4 and a similar hydraulic circuit through the valve DV2 and leading to the cylinders 70 through the ports 176, these circuits being energized and actuated upon movement of the control lever 412 in a clockwise direction as viewed in FIG. 13. Such movement of the lever 412 establishes a circuit extending from the source S through a lead 351, the winding S4, two leads 353 and 355, the #2 contacts of the lever 412 (now closed) and the lead 343 to the source S. Energization of the solenoid winding S4 establishes an hydraulic circuit from the sump 341, through a line 349, the valve DV2, a line 347 and the ports 176 to the cylinders 70, thus advancing these cylinders and shifting the boom carriage 32 forwardly. Fluid is exhausted from the cylinders 70 through the ports 174, the lines 345 and 342, and the pump 66 back to the sump 341A. When the lever 412 is in its neutral position, both the #1 and the #2 contacts of the lever are open and the flow of fluid through the valve DV2 is blocked both to and from the sump 341.

*The boom elevation control.*—Referring now to FIG. 14, wherein the electrically controlled hydraulic circuitry for effecting forward and rearward rocking movement of the boom assembly 30 bodily as a whole to raise and lower the grinding head 16 is illustrated, the previously described electric circuit for the motor M3 illustrated in FIG. 13 is also illustrated in FIG. 14 inasmuch as this motor drives the pump 66 and the pump serves to supply fluid under pressure to the boom cylinder 60 as well as serving to supply fluid under pressure to the two cylinders 70. The pump 66 which is driven by the motor M3 is connected to the ends of the cylinder 60 through a directional valve DV3 under the control of a single acting solenoid, the winding S5 of which is disposed in an electric circuit including a pair of normally open contacts which are associated with the control lever 420 in the operator's control cab 54.

During grinding machine operation, with the motor M3 energized and the lever 420 in its inoperative or retracted position, the condition of the directional valve DV3 will be such that fluid under pressure is conducted from the sump 341A through the pump 66, a line 361, the valve DV3, a line 363 and the port 67 to the upper end of the cylinder 60, thus retracting the cylinder upwardly to the fullest extent of which it is capable and raising the boom 18 to its normal substantially horizontal position so as, in turn, to raise the grinding head and wheel above the level of the piece of work being conditioned. Upon swinging movement of the lever 420 to its operative position (counterclockwise direction as viewed in FIG. 14), the contacts thereof will become closed, thus establishing an electric circuit extending from the source S through a lead 365, the solenoid winding S5, a lead 367, the contacts of the lever 420, and a lead 369 back to the source. Energization of the solenoid winding S5 will shift the valve SD3 and cause fluid under pressure to be conducted to the lower region of the cylinder 60 through an hydraulic circuit extending from the sump 341A, through the pump 66, the line 361, the valve DV3, a line 371 and the port 69 to the lower region of the cylinder 60, thus moving the cylinder in a downward direction and lowering the boom 18 so as to bring the grinding wheel 14 into contact with the workpiece under constant or uniform grinding pressure, all in the manner previously described.

Grinding machine operation

From the foregoing description, it is believed that the operation of the grinding machine will be to a large extent readily apparent without further description. Assuming a billet such as the billet 10 or other workpiece to have been operatively mounted on the supporting structure 12 for a grinding operation, depression of the three start buttons 400, 402 and 404 will effect energization of the electric motors M2, M3 and M1, respectively, thus effecting operation of the pump 52 which serves the hydraulic combined motor and gear train device 50 which, in turn, drives the machine base assembly 46; causing rotation of the grinding wheel 14; and effecting operation of the pump 66 which serves the two boom carriage-impelling cylinders 70 and also serves the cylinder 60 which effects swinging or tilting of the entire boom assembly 30. With the grinding wheel thus rotating and the hydraulic pumps 52 and 66 in operation, the various controls offered by the two pedals 90 and 92 in the operator's cab 54, and the remaining controls on the control panel 94, afford the operator command of all the necessary adjuncts for effecting immediate operation of the grinding machine for all normal grinding purposes and in whatever manner or sequence he may elect to follow, whether this operation be completely manual or automatic.

If billet-traversing operations are first to be initiated, the operator will bring the machine base assembly 46 to a position of transverse register with the point on the billet 10 where grinding contact is first to be made by selective manipulation of the foot pedals 90 and 92, after which the grinding wheel 14 is brought into vertical register with this initial point of contact by selective manipulation of the control lever 412 to direct fluid under pressure to the cylinders 70 and effect movements, as required, of the boom carriage 32. With the grinding wheel 14 in vertical register with the initial grinding point on the billet 10, the operator may then employ the lever 420 to direct fluid under pressure to the lower region of the cylinder 60 below the piston 63, thus swinging the entire boom assembly 30 bodily about the axis of the shaft 31 in a direction to lower the grinding wheel 14 upon the initial grinding point. As soon as the rotating grinding wheel becomes fully seated upon the billet 10, a constant grinding pressure will be maintained commensurate with the pressure maintained in the cylinder 60. At this point traversing operations may be commenced by operation of the appropriate foot pedal 90 or 92, as the case may be. Travel of the machine base assembly 46 along the rails 48 will effect the desired traverse of the grinding wheel 14 on the billet 10.

Traverse operations are conducted alternately in opposite directions and, at the end of each traverse operation, the operator will employ the control lever 412 to shift the boom carriage 32 forwardly or rearwardly, as desired, to bring the grinding wheel 14 to a new position of transverse register with the surface of the billet 10. The grinding wheel will thus be directed in a serpentine path over the entire face of the billet 10 until the grinding operation has been completed.

If the operator desires automatic indexing of the boom carriage 32 at the end of each traverse operation, it is merely necessary for him to depress the control button 406, thus effecting automatic injection of measured quantities of fluid into the cylinders 70 to shift the boom carriage 32 in either a forward or a rearward direction, as desired, throughout a selected small increment of motion at the end of each traverse operation and preparatory to commencing the next succeeding traverse operation. The specific means for effecting this automatic indexing operation forms the subject-matter of aforementioned copending patent application Serial No. 372,032.

After the surface of the billet 10 has been conditioned by repetitive billet-traversing operations as described above, and to the extent deemed expedient by the operator, spot-grinding operations may be instituted, utilizing the automatic grinding wheel head oscillating mechanism 76 of FIG. 6. This mechanism is set into operation in the manner previously described by depressing the control button 407. Obviously, the operator will select a particular spot to be thus treated, cause the grinding wheel 14 to be elevated above the level of the billet, manipulate the pedals 90 and 92 and the control lever 412 to bring the oscillating and rotating grinding wheel 14 into vertical register with the spot to be treated, and, finally, cause the grinding wheel to be lowered into contact with the billet by manipulation of the control lever 420.

It is to be noted that throughout the entire operation of the grinding machine, grinding pressure on the billet 10 is largely a function of hydraulic pressure maintained in the cylinder 60. Gravitational forces operating upon the grinding wheel are not relied upon for grinding pressure, such forces being negligible due to the fact that the boom assembly 30 as a whole is substantially balanced on the shaft 31 so that its pivotal axis passes substantially through its center of mass. Preferably, with a new large diameter grinding wheel, boom assembly balance will slightly favor the boom housing 20. With a worn grinding wheel, boom assembly will, of course, favor the boom housing 20 to a greater extent. Thus, in the event of a failure of the hydraulic system, a slight degree of unstable equilibrium will cause the grinding wheel 14 to rise from the surface of the billet or other workpiece undergoing treatment.

It is also to be noted that this hydraulically initiated grinding pressure is maintained substantially constant by reason of the two independent hydraulic systems associated with the machine, one system involving the pump 66 (FIG. 1A) and the other system involving the pump 52 (FIG. 1). A load exerted on the pump 52 for movement of the assembly 46 and consequently grinding wheel traverse operations on the billet 10 will not place a drain upon or otherwise affect the normal operation of the pump 66 which may thus supply the cylinder 60 with a full head of hydraulic fluid to maintain full grinding pressure at the grinding wheel.

Finally, it is to be noted that this substantially constant hydraulic grinding pressure is not appreciably affected by machine framework sag or shock deflection. The various working points which establish a down-pressure upon the grinding wheel for grinding purposes are closely grouped together and, moreover, they are all in close proximity to the grinding wheel spindle. The relatively massive low bridge construction which is established by the two guide tubes 36 finds support at both ends, i.e., on the machine base assembly 46 and on the standards 44, the tail stock carriage 40 and the guide rail 42. These guide tubes are, in effect, further reinforced by the long span of the sleeves 150 which slide on these guide tubes and are, in themselves, relatively massive. There is little deflection possible in the cross member 152 of the H-shaped casing 34 since the weight of the boom assembly 30, as a whole, is supported by the shaft 31 near the opposite ends of the cross member 152 and not at its mid-point where deflection would normally be at a maximum. Due to the extremely short extent of the boom 18, boom deflection is substantially negligible. By these tokens, grinding machine vibration is maintained at a minimum and the overall machine noise level is extremely low, both during grinding machine operation and machine idling.

From a constructional point of view, it may be observed that the two bearing supports 156 are disposed on the cross member 152 of the H-shaped casting 34 at a region displaced from the center of the cross member. This arrangement of the bearing supports places the boom assembly 30 well to one side of the main carriage and allows the operator's control cab 54 to be disposed on the other side of the machine base assembly 46 for a full and unobstructed view of the grinding wheel 14 at all times.

The invention is not to be limited to the exact arrangement of parts shown in the accompanying drawings or described in this specification as various changes in the details of construction may be resorted to without departing from the spirit or scope of the invention. If desired, a wide variance in both the hydraulic and electrical circuitry as described herein may be resorted to without departing from the basic principles of the invention. For example, in FIG. 1A the motor M3 is shown in FIG. 1A as driving a single hydraulic pump 66, this pump serving the hydraulic boom cylinder 30 as well as the two carriage-actuating cylinders 70. Obviously, it is within the scope of the present invention to make provision for separately supplying fluid under pressure to the boom cylinder and the two carriage-actuating cylinders thus isolating the two systems hydraulically so that carriage movements will not affect boom movements and vice versa by deprivation of either system of full hydraulic pressure when both systems are brought into operation simultaneously. One means for providing such separate hydraulic systems may be effected by the provision of an additional pump 66a such as is shown in dotted lines in FIG. 1A and operatively connecting the output of such pump to either the cylinder 60 or to the two cylinders 70 to the exclusion of the pump 66. Therefore, only insofar as the invention has particularly been pointed out in the accompanying claims is the same to be limited.

Having thus described the invention, what I claim as new and desire to secure by Letter Patent is:

1. In a machine for conditioning the surface of an elongated workpiece such as a billet, in combination, means providing a work-supporting structure for the workpiece, track rails positioned forwardly and rearwardly of the work-supporting structure and extending lengthwise thereof, a main carriage adapted to travel on the rear track rail, a tail stock carriage adapted to travel on the front track rail, a pair of overhead parallel guide rails overlying and extending in a forward and rearward direction transversely of the work-supporting structure and lying in a parallel horizontal plane, having their rear ends secured to and supported on said main carriage and having their forward ends secured to and supported on the tail stock carriage, reversible motor means for impelling the main carriage along the rear track rail selectively in opposite directions, thus shifting the main carriage, guide rails and tail stock carriage bodily as a unit lengthwise of the work-supporting structure, a boom carriage slidable is a forward and rearward direction on said overhead guide rails, said boom carriage being in the form of a rigid structure including a pair of elongated guide sleeves encompassing and slidable on said guide rails, and, in addition, an interconnecting cross member, a horizontal pivot shaft mounted on said cross member, a boom assembly pivoted for rocking movements on said point shaft about a horizontal axis extending lengthwise of the work-supporting structure, said boom assembly including a boom housing, a boom rigidly supported on the boom housing and projecting forwardly therefrom, a driven grinding wheel rotatably mounted on the forward end of the boom in workpiece-traversing relationship, and a drive motor on the boom housing operatively connected to the grinding wheel in driving relationship, the boom and grinding wheel mounted thereon being disposed forwardly of said pivot shaft, and the boom housing and drive motor mounted thereon being disposed rearwardly of the pivot shaft in counter-balancing relation with respect to the boom and grinding wheel, reversible motor-actuated means for effecting rocking movements of the boom assembly selectively in opposite directions, and reversible motor-actuated means for effecting sliding movements of the boom carriage on said overhead guide rails.

2. A conditioning machine as set forth in claim 1 and wherein the pivotal axis of rocking movement of the boom assembly passes approximately through its center of mass, and wherein the boom assembly, as a whole, possesses a relatively high degree of inertia resisting said reversible motor-actuated means.

3. A conditioning machine as set forth in claim 1 and wherein the mass of said boom and the grinding wheel carried thereby is slightly overbalanced by the mass of the boom housing and drive motor on opposite side sides of the pivotal axis of rocking movement of the boom assembly, and wherein the boom assembly, as a whole, possesses a relatively high degree of inertia resisting said reversible motor-actuated means.

4. A conditioning machine as set forth in claim 1 and wherein said reversible motor-actuated means for effecting rocking movements of the boom assembly includes an extensible and contractible hydraulic cylinder and piston assembly connected at one end to a fixed point on the boom carriage and at the other end to the boom at a point adjacent to the forward end of the latter, and wherein the boom assembly, as a whole, possesses a relatively high degree of inertia resisting said reversible motor-actuated means.

5. A conditioning machine as set forth in claim 1 and wherein the reversible motor means for impelling the main carriage along said track rails comprises an electric motor on the main carriage, a hydraulic pump on said main carriage and connected to the electric motor in driven relationship, a carriage-driving hydraulic motor on said main carriage and connected to the pump in driven relationship, said main carriage being provided with an operator's station having operating controls for reversing the flow of hydraulic fluid from the pump to the hydraulic motor.

6. A conditioning machine as set forth in claim 5 and wherein the reversible motor-actuated means for effecting rocking movements of the boom assembly comprises a second electric motor on the boom carriage, a second hydraulic pump on said boom carriage and connected to the second electric motor in driving relationship, an extensible and contractible hydraulic cylinder and piston assembly connected at one end to a fixed point on the boom carriage and at the other end to the boom at a point adjacent to its forward end and operatively connected to the second hydraulic pump in driven relationship, and a hand control at the operator's station for reversing the flow of hydraulic fluid from the second pump to the cylinder and piston assembly.

7. In a machine for conditioning the surface of an elongated workpiece such as a billet, means providing a work-supporting structure for the workpiece, track rails positioned forwardly and rearwardly of the work-supporting structure and extending lengthwise thereof, a main carriage adapted to travel on the rear track rail, a tail stock carriage adapted to travel on the front track rail, a pair of overhead parallel guide rails overlying and extending transversely of the supporting structure, having their rear ends secured to and supported on said main carriage and having their forward ends secured to and supported on the tail stock carriage, reversible motor means for impelling the main carriage along the rear track rail selectively in opposite directions, thus shifting the main carriage, guide rails and tail stock carriage bodily as a unit lengthwise of the supporting structure, a boom carriage slidable in a forward and rearward direction on said overhead guide rails, said boom carriage being in the form of an H-casting having sleeve portions surrounding and slidable on the guide rails, and an interconnecting cross member, a pair of spaced bearing supports on said cross member, a horizontal supporting shaft extending between said bearing supports, a boom assembly including a boom housing pivoted adjacent to its forward end to said supporting shaft for limited rocking movements about the axis of the shaft and projecting rearwardly of the cross member, a boom having one end fixedly secured to the boom housing and projecting forwardly of the cross member, a driven grinding wheel rotatably mounted on the forward end of the boom in workpiece-traversing relationship, driving means for the grinding wheel supported on the boom housing and operatively connected to the grinding wheel in driving relationship, said boom housing and driving means on the one hand and said boom and grinding wheel on the other hand substantially balancing each other on opposite sides of the supporting shaft whereby the boom assembly, in its free state, is substantially balanced and possesses a substantial degree of stable equilibrium in any position thereof, an elevated crosshead on said H-casting overlying the working area of the grinding wheel, a first extensible and contractible hydraulic cylinder and piston assembly connected at its lower end to the forward end of the boom and at its upper end to said crosshead at a point substantially in vertical register with the grinding wheel, said first cylinder and piston assembly being operable upon extension thereof to effect rocking movement of the boom assembly in a direction to force the grinding wheel downwardly against a workpiece on said work-supporting structure and being operable upon contraction thereof to raise the grinding wheel from the workpiece, a second extensible and contractible cylinder and piston assembly extending between the main carriage and the H-casting and operable upon extension thereof to shift the boom carriage transversely of the work-supporting structure in one direction and operable upon contraction thereof to shift the boom carriage transversely of the work-supporting structure in the opposite direction, and a single hydraulic system including a hydraulic pump and electric driving motor therefor for selectively supplying motive fluid to said cylinder and piston assemblies.

8. A conditioning machine as set forth in claim 7 and wherein said second cylinder and piston assembly includes a cylinder fixedly secured to and substantially coextensive with one of the sleeve portions of the H-casting, a reaction piston disposed within said cylinder, and a reaction rod extending between the reaction piston and fixedly secured to the main carriage.

9. A conditioning machine as set forth in claim 7 and wherein said second cylinder and piston assembly includes a cylinder fixedly secured to and substantially coextensive with each of the sleeve portions of the H-casting, reaction pistons disposed within said cylinders, and reaction rods extending between the reaction pistons and fixedly secured to the main carriage.

10. A conditioning machine as set forth in claim 7 and wherein said main carriage embodies an operator's control cab, wherein the mean position of the bearing supports on the cross member of the H-casting is disposed appreciably closer to one of the sleeve portions than to the other sleeve portion whereby the boom assembly as a whole is laterally displaced on the boom carriage in one direction, said operator's control cab being displaced on the main carriage in the opposite direction so that the working area of the grinding wheel is at all times in full view thereof.

11. In a machine for conditioning the surface of an elongated workpiece such as billet, means providing a work-supporting structure for the workpiece, track rails positioned forwardly and rearwardly of the work-supporting structure and extending lengthwise thereof, a main carriage adapted to travel on the rear track rail, a tailstock carriage adapted to travel on the front track rail, a pair of overhead parallel guide rails overlying and extending transversely of the supporting structure, having their rear ends secured to and supported on said main carriage and having their forward ends secured to and supported on the tail stock carriage, reversible motor means for impelling the main carriage along the rear track rail selectively in opposite directions, thus shifting the main carriage, guide rails and tail stock carriage bodily as a unit lengthwise of the supporting structure, a boom carriage slidable in a forward and rearward direction on said overhead guide rails, a boom assembly pivoted for rocking movements on said boom carriage about a horizontal axis extending lengthwise of the work-supporting structure, said boom assembly including a boom housing, a boom rigidly supported on the boom housing and projecting forwardly and downwardly therefrom, a grinding head mounted on the forward end of the boom for limited oscillating movements about the longitudinal axis of the boom and including a rotatable driven grinding wheel, and a drive motor operatively connected to the grinding wheel in driving relationship, reversible motor-actuated means for effecting rocking movements of the boom assembly selectively in opposite directions, reversible motor-actuated means for effecting sliding movements of the boom carriage on said overhead guide rails, an electric motor and gear reduction assembly mounted on the boom, movable bodily therewith and designed for effecting oscillation of the grinding head, said assembly including an eccentric wheel, a crank arm effectively connected to the grinding head, and a coupling member operatively connecting the crank arm and eccentric wheel.

12. In a machine for conditioning the surface of an elongated workpiece such as billet, means providing a work-supporting structure for the workpiece, track rails positioned forwardly and rearwardly of the work-supporting structure and extending lengthwise thereof, a main carriage adapted to travel on the rear track rail, a tail stock carriage adapted to travel on the front track rail, a pair of overhead parallel guide rails overlying and extending transversely of the supporting structure, having their rear ends secured to and supported on said main carriage and having their forward ends secured to and supported on the tail stock carriage, reversible motor means for impelling the main carriage along the rear track rail selectively in opposite directions, thus shifting the main carriage, guide rails and tail stock carriage bodily as a unit lengthwise of the supporting structure, a boom carriage slidable in a forward and rearward direction on said overhead guide rails, a boom assembly pivoted for rocking movements on said boom carriage about a horizontal axis extending lengthwise of the work-supporting structure, said boom assembly including a boom housing, a boom rigidly supported on the boom housing and projecting forwardly and downwardly therefrom, a grinding head mounted on the forward end of the boom for limited oscillating movements about the longitudinal axis of the boom and including a rotatable driven grinding wheel, and a drive motor operatively connected to the grinding wheel in driving relationship, reversible motor-actuated means for effecting rocking movements of the boom assembly selectively in opposite directions, reversible motor-actuated means for effecting sliding movements of the boom carriage on said overhead guide rails, said boom including an outer boom tube and an inner boom shaft concentric therewith and capable of oscillation therein about the longitudinal axis of the boom tube, said inner boom shaft projecting outwardly beyond the forward end of the boom tube and serving to support the grinding head, there being a slot in the wall of said outer boom tube, a crank arm secured at one end to the inner boom shaft and projecting outwardly through the slot, and electric motor mounted on the outer boom tube, an eccentric wheel driven by said electric motor, and a coupling operatively connecting the eccentric wheel and crank arm in driving relationship for oscillating the boom shaft and consequently the grinding head supported thereon.

13. In a machine for conditioning the surface of an elongated workpiece such as a billet, means providing a work-supporting structure for the workpiece, track rails positioned forwardly and rearwardly of the work-supporting structure and extending lengthwise thereof, a main carriage adapted to travel on the rear track rail, a tailstock carriage adapted to travel on the front track rail, a pair of overhead parallel guide rails overlying and extending transversely of the supporting structure, having their rear ends secured to and supported on said main carriage and having their forward ends secured to and supported on the tail stock carriage, reversible motor means for impelling the main carriage along the rear track rail selectively in opposite directions, thus shifting the main carriage, guide rails and tail stock carriage bodily as a unit lengthwise of the supporting structure, a boom carriage slidable in a forward and rearward direction on said overhead guide rails, a boom assembly pivoted for rocking movements on said boom carriage about a horizontal axis extending lengthwise of the work-supporting structure, said boom assembly including a boom housing, a boom rigidly supported on the boom housing and projecting forwardly and downwardly therefrom, a grinding head mounted on the forward end of the boom for limited oscillating movements about the longitudinal axis of the boom and including a rotatable driven grinding wheel, and a drive motor operatively connected to the grinding wheel in driving relationship, reversible motor-actuated means for effecting rocking movements of the boom assembly selectively in opposite directions, reversible motor-actuated means for effecting sliding movements of the boom carriage on said overhead guide rails, an electric motor and gear reduction assembly mounted on the boom, movable bodily therewith and designated for effecting oscillation of the grinding head, said assembly including an eccentric wheel, a crank arm effectively connected to the grinding head, and a coupling member operatively connecting the crank arm and eccentric wheel, the mass of said boom and the electric motor carried thereby, and of the grinding head carried by the boom, substantially balancing the mass of the boom housing and drive motor on opposite sides of the pivotal axis of the boom assembly on the boom carriage.

References Cited by the Examiner

UNITED STATES PATENTS

| | | | |
|---|---|---|---|
| 1,462,420 | 7/1923 | Mikaelson et al. | 51—47 X |
| 2,750,714 | 6/1956 | Muehling | 51—35 X |
| 2,769,280 | 11/1956 | Comstock | 51—47 X |
| 2,845,751 | 8/1958 | Woodward | 51—35 X |
| 2,955,388 | 10/1960 | Lavner | 51—35 |
| 3,089,287 | 5/1963 | Dilks | 51—35 |
| 3,156,072 | 11/1964 | Boehme | 51—35 X |

FOREIGN PATENTS

| | | |
|---|---|---|
| 766,145 | 1/1957 | Great Britain. |
| 1,135,668 | 5/1957 | France. |

LESTER M. SWINGLE, *Primary Examiner.*

ROBERT C. RIORDON, *Examiner.*

J. ADDISON MATHEWS, *Assistant Examiner.*